Figure 3:
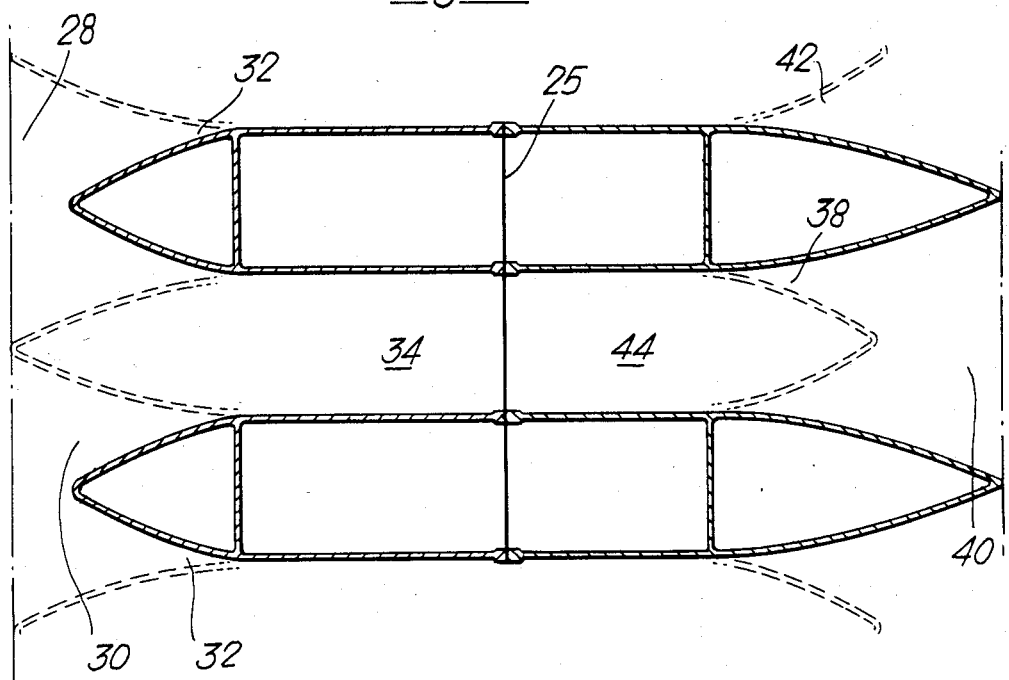

United States Patent [19]

Simmons

[11] Patent Number: 4,803,837
[45] Date of Patent: Feb. 14, 1989

[54] DUAL CYCLE GAS TURBINE ENGINES

[75] Inventor: Roy Simmons, Bristol, England

[73] Assignee: Rolls-Royce plc, London, England

[21] Appl. No.: 776,789

[22] Filed: Mar. 8, 1977

[30] Foreign Application Priority Data

Mar. 9, 1976 [GB] United Kingdom ............... 09263/76

[51] Int. Cl.[4] .............................................. F02K 3/02
[52] U.S. Cl. .................. 60/226.3; 244/12.5;
244/23 D; 60/263
[58] Field of Search ................. 60/224, 226 R, 226 B,
60/229, 230, 232, 263; 244/12.1, 12.3, 12.4,
12.5, 23 B, 23 D

[56] References Cited

U.S. PATENT DOCUMENTS 3,792,584 2/1974 Klees ...................................... 60/229
3,854,286 12/1974 Klees ................................. 60/226 B Primary Examiner—Stephen C. Bentley
Attorney, Agent, or Firm—Parkhurst, Oliff & Berridge

[57] ABSTRACT

A gas turbine includes a change-over valve having a rotatable part and a static part. The valve is disposed between upstream and downstream compressors of the engine for selectively directing flows from the upstream compressor and an auxiliary inlet to the downstream compressor or an auxiliary outlet, the downstream static part of the valve being formed as a structural element of the engine casing from which extends forwardly a support member which carries bearings for supporting the forward rotating part of the valve and the casing of the compressor.

4 Claims, 4 Drawing Sheets

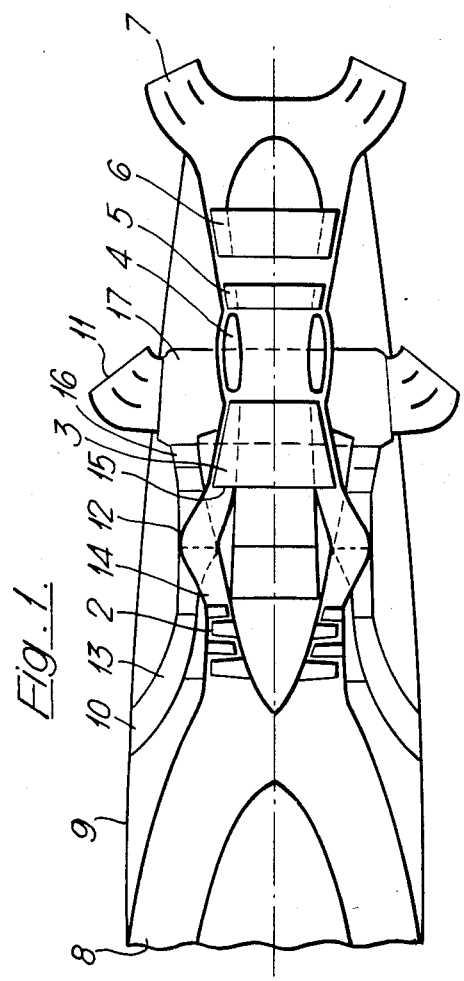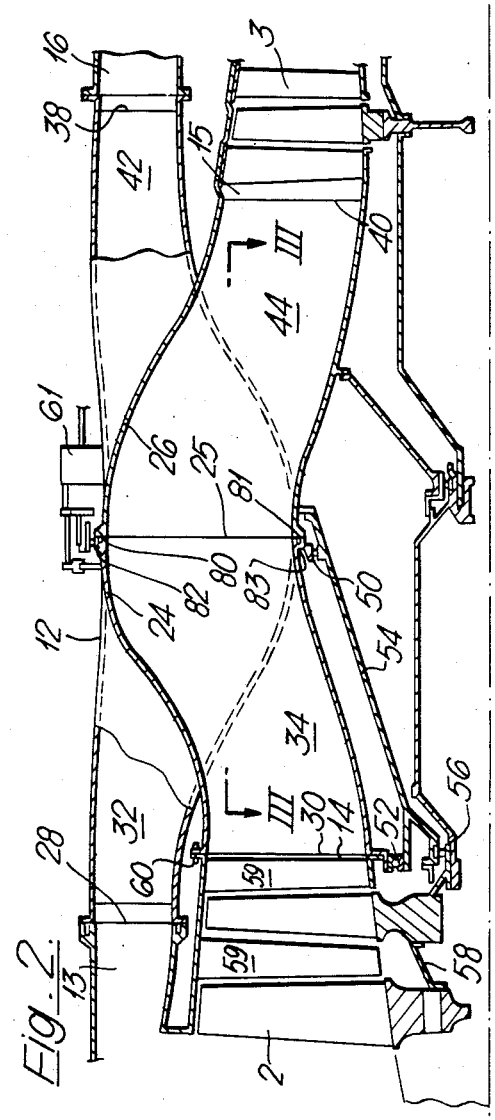

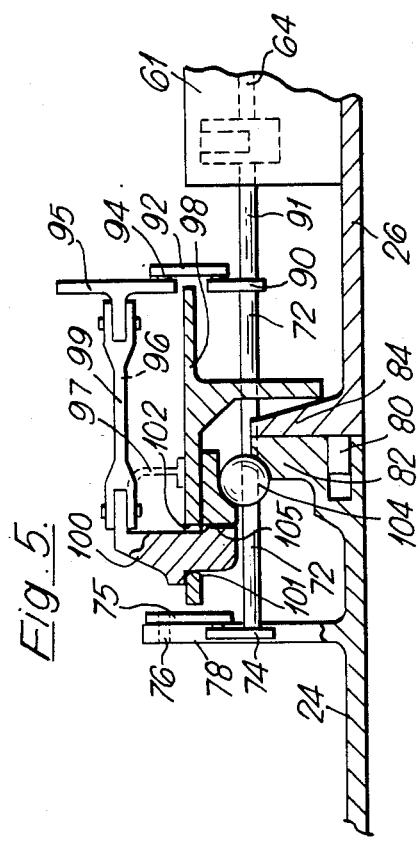
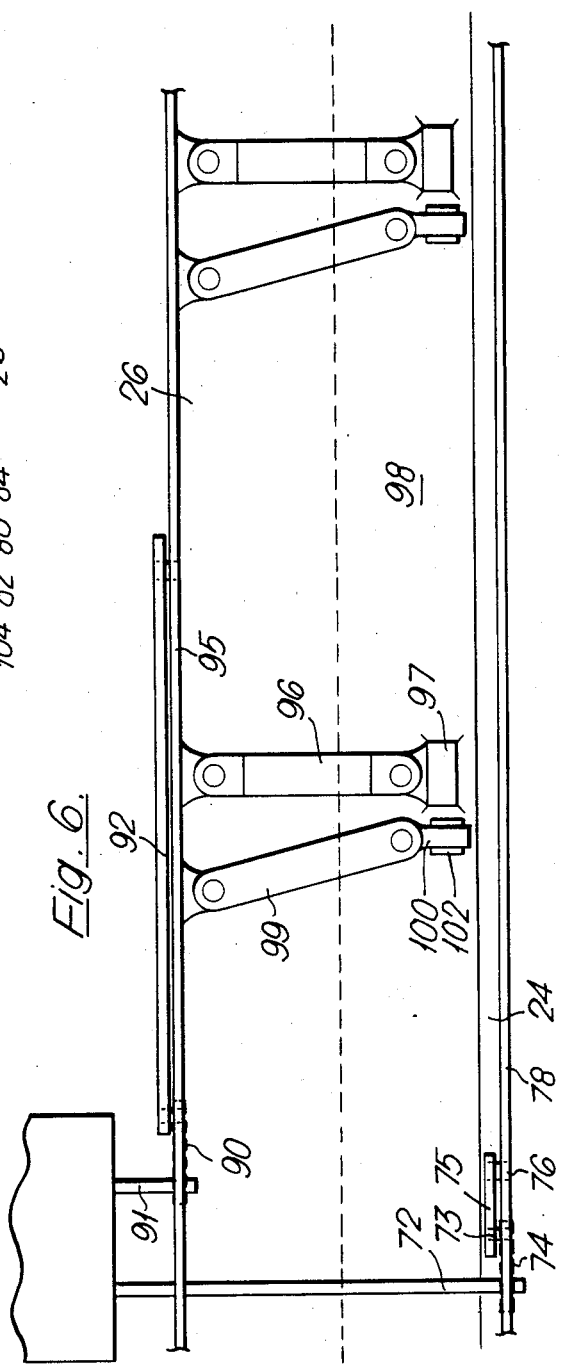

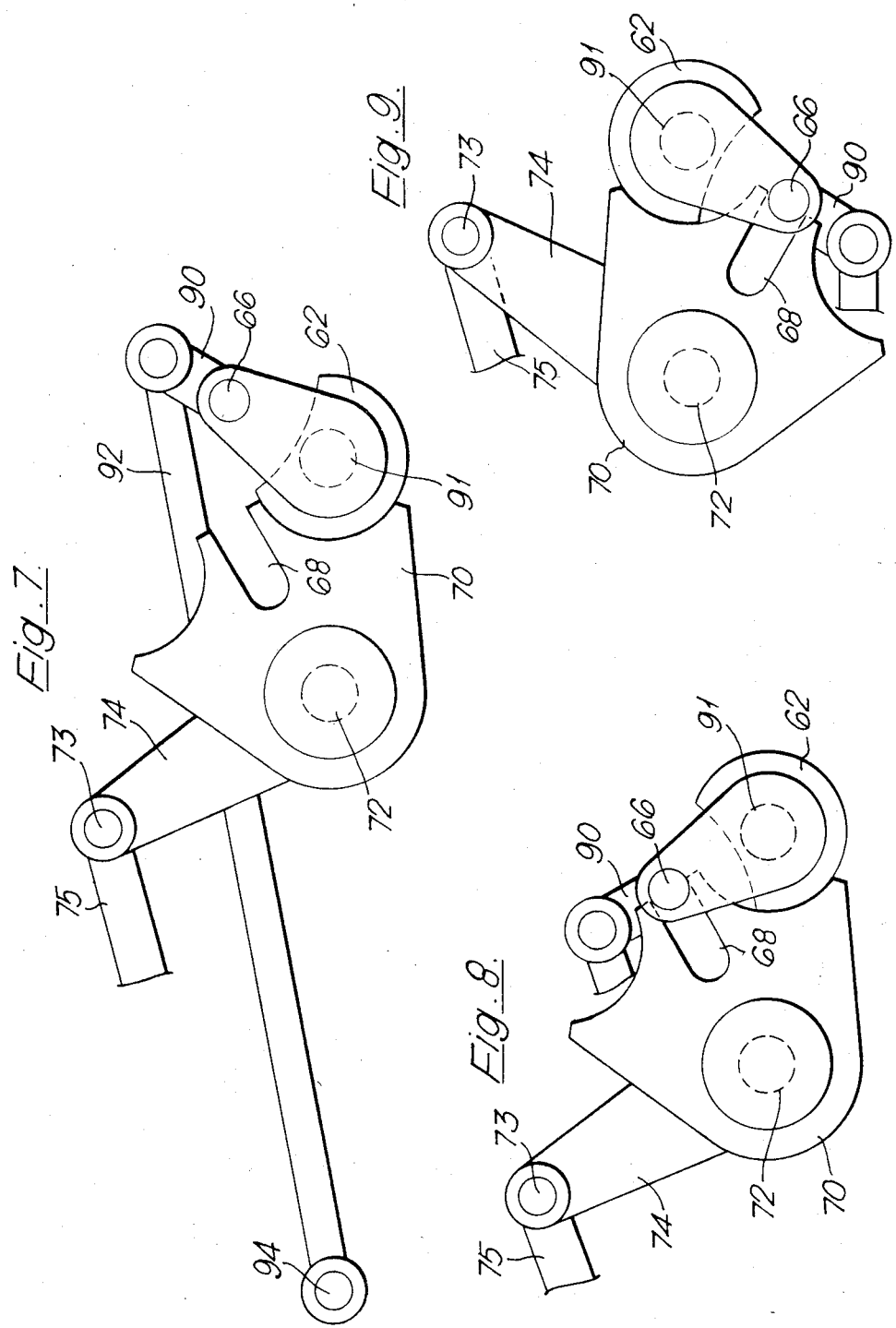

DUAL CYCLE GAS TURBINE ENGINES

The present invention relates to gas turbine engines capable of dual operation, for example capable of operating as pure jet engines or as bypass engines.

Such engines require a change-over valve for selectively switching from one mode of operation to the other.

A known type of change-over valve is annular and has two separate inlets and two separate outlets. Passage-ways within the valve provide flow connections between the inlets and the outlets and one part of the valve is made rotatable relative to the remainder so that by rotation of said one part through a given angle the passage-ways leading from one of the inlets can be changed over from communication with one of the outlets to communication with the other of the outlets.

The object of the present invention is to provide means for mounting the rotatable part of such a valve in a gas turbine engine.

According to the present invention there is provided a gas turbine engine comprising a first compressor having an outlet duct, a second compressor disposed downstream of the first compressor and having an inlet passage, an auxiliary inlet duct and an auxiliary outlet passage, a change-over valve disposed in flow series between said compressors, said valve having inlets and outlets for communication with said ducts and passages respectively, and having internal passageways therein which provide flow connections between the inlets and outlets, means being provided for rotating an upstream part of the valve relative to the remainder whereby either one of the ducts may be put into flow communication with a selected one of the passages, and wherein the downstream part of the valve is formed as a main structural element of the engine casing and a support member is connected thereto which extends forwardly therefrom and which carries bearings for rotatably supporting both the rotatable part of the valve and the outer casing of the first compressor.

In one embodiment of the invention the first compressor is a low pressure compressor fan, and the upstream part of the valve is rotatable along with the casing of the low pressure compressor.

In a preferred embodiment of the invention the auxiliary inlet duct communicates at one end with an auxiliary intake in the engine outer casing, or in the fuselage of an aircraft in which the engine is mounted, and said auxiliary outlet passage delivers flow to a by-pass duct from the valve.

Figure 4:
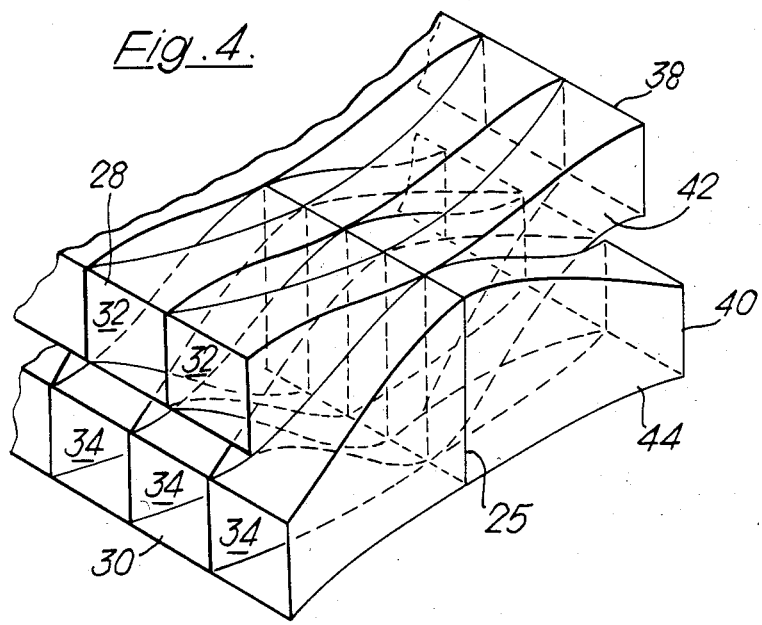

The invention will now be more particularly described, by way of example only, with reference to the accompanying drawings in which:

FIG. 1 is a section through a vectored thrust engine embodying the invention and illustrating diagrammatically the valve and its associated structure, FIG. 2 is an enlarged section through the valve of FIG. 1 including the compressors and auxiliary inlets and outlets, FIG. 3 is a developed sectional plan view on the line III—III of FIG. 2, FIG. 4 is a diagrammatic illustration of the valve in the position required for operation of the engine as a turbo-jet engine, FIG. 5 shows a section through the operating mechanism for rotating the valve, FIG. 6 is a developed plan view of FIG. 5, and, FIGS. 7, 8 and 9 show detail of the valve operating mechanism in its different operating positions.

Referring now to FIG. 1 there is shown a dual cycle gas turbine engine having a low pressure (L.P.) compressor 2, a high pressure (H.P.) compressor 3, combustion equipment 4, an H.P. turbine 5, an L.P. turbine 6, and a pair of rotatable propulsion nozzles 7. Air is supplied to the L.P. compressor through a bi-furcated co-axial intake 8.

The engine is disposed within an aircraft fuselage 9 in which are defined auxiliary intakes 10 and a pair of rotatable nozzles 11.

The two pairs of rotatable nozzles 7 and 11 are capable of rotating between positions in which they direct gases passing through them either downwardly, to provide vertical thrust, or rearwardly to provide horizontal thrust.

A change-over valve 12 is disposed between the L.P. compressor 2 and the H.P. compressor 3. The valve is capable of receiving flow from both the intake 10, via an auxiliary intake duct 13, and from the L.P. compressor 2 via a compressor outlet duct 14, and is capable of delivering said flows either to an inlet passage 15, leading to the compressor 3, or th an auxiliary outlet passage 16, leading to a plenum chamber 17, on which are mounted the exhaust nozzles 11.

The valve 12 which is shown in greater detail in FIGS. 2 to 4 consists of two main parts, a rotatable upstream part 24 and a static downstream part 26 split at an interface 25. The up[stream part has two annular inlets 28 and 30 which are divided by a plurality of walls into two series of passageways 32 and 34 respectively. Inlet 28 is arranged to communicate with the auxiliary intake duct 13, and the inlet 30 is arranged to communicate with the compressor outlet duct 14. The passage-ways within the valve are rearranged so that at the interface 25, the passage-ways 32 and 34 have ceased to be radially spaced and are interdigitated to provide an annular array of openings which communicate alternatively with passage-ways 32 and 34.

Similarly the downstream part 26 comprises a plurality of radially spaced annular outelts 38 and 40 which communicate with an identical annular array of openings at the interface 25, by means of passage-ways 42 and 44 which connect the openings alternately with outlets 38 and 40. Outlet 38 opens into the auxiliary outlet passage 16, and the outlet 40 opens directly into the inlet passage 15 of the H.P. compressor 3.

It can be seen therefore that by rotation of the upstream part of the valve relative to the downstream part by an amount equal to the pitch of the openings at the interface 25, the flow through intakes 10 can be passed either to the H.P. compressor or to the passage 16, and similarly the delivery from the L.P. compressor can be passed to the passage 16 or to the H.P. compressor. This can be seen from FIGS. 3 and 4, both of which show the valve in the position in which the flow from the L.P. compressor is passed to the H.P. compressor, i.e., pure jet operation.

In order that the upstream part 24 of the valve may be rotated, it is supported in bearings 50 and 52 which are carried by means of a cone 54 from the downstream part 26 of the valve. The downstream part 26 is made as a main structural element of the engine casing so that the cone 54 can also be used to support a bearing 56 which in turn supports the rotor 58 of the compressor 2.

In addition, the casing of the compressor 2, including the static blades 59 are connected to the valve part 24 through a bolted joint 60 so that the casing is also rotatable with the valve part 24.

This construction avoids the provision of additional main structural elements for carrying the compressor rotor and casing so that the engine outer casing upstream of the valve may be a relatively light structure.

An operating mechanism for rotating the valve will now be described with reference to FIGS. 5 to 9.

A plurality of Geneva mechanisms are provided only one of which is shown and described. Each mechanism is housed in a box 61 mounted on the static part 26 of the valve. The mechanism consists of a driving wheel 62 driven by a shaft 64 which in turn is driven by any suitable means (not shown) under pilot's control, for example, an air motor or a rack and pinion drive. The driving wheel carries a pin 66 which is capable of entering a slot 68 in a driven wheel 70.

The driven wheel 70 also drives a shaft 72 which carries a lever 74 which is pin-jointed at 73 to a link 75, which in turn is pin-jointed at 76 to an annular flange 78 on the rotatable part 24 of the valve. As the wheel 62 is rotated anti-clockwise by the shaft 64 from a first position as shown in FIG. 7 to a second position as shown in FIG. 9, the pin 66 on wheel 62 enters the slot 68 in the wheel 70 thus turning it clockwise and moving lever 74 to rotate the valve part 24. The movement of the wheel 62 need only be between two end positions at which the valve has moved sufficiently to rotate the openings at the interface 25 by one pitch. There may be up to six mechanisms each with its associated levers and links connecting the mechanism to flange 78 and a locking ring 95 described below.

An additional clamping mechanism is introduced in order to ensure that the interface is properly sealed, and that the moveable structure is securely clamped to the static structure, when the valve part 24 is not being rotated. Seals 80, 81 are provided in flanges 82, 83 which extend circumferentially around the interface on the radially outer and inner walls respectively of the valve (see FIG. 2).

The clamping mechanism is arranged to clamp flange 82 firmly against an adjacent flange 84 on the static part 26 of the valve. The mechanism consists of a lever 90 carried by a shaft 91 on the wheel 62. The lever 90 is pin-jointed at 93 to a link 92 which in turn is pin-jointed at 94 to an annular locking ring 95. Ring 95 is supported from the static part 24 of the valve by a series of links 96 connected to fixed pivots 97 (shown dotted in FIG. 5) on a fixed annular plate 98. A second series of pivotable links 99 are provided and which are pin-jointed at one end to the ring 95 and at the other end to a pivoting lever 100 which pivots about the edge 101 of an aperture 102 in the plate 98.

The operation is as follows: When wheel 62 is rotated, say from the FIG. 7 position, lever 90 moves anti-clockwise and pushes lever 92 axially to the left, i.e. to the FIG. 6 position. The ring 95 is thus also pushed to the left which pivots links 99 about the pin-joint at the pivoting lever 100. Since the axial movement of the ring 95 relative to the plate 98 is restricted by the links 96 connected to the fixed pivot 97, the links 99 pull axially on the levers 100 which pivot to release clamping pressure on a ball 104 clamped between a bearing race 105 and the flange 82. While the wheel 62 passes through its FIG. 8 position to rotate valve part 24 the falnge remains unclamped as lever 90 is moving with virtually no axial component of movement. But as the wheel approaches its FIG. 9 position, lever 90 once again has an axial component of movement, this time in the opposite direction, and moves lever 92 back, i.e., to the right in FIG. 6, to clamp the ball 102 against the flange once again.

The pin joints 93 and 94 may be substituted by universal joints to allow free movement of ring 95 axially without danger of jamming.

I claim:

1. A gas turbine engine comprising a first compressor having an outlet duct, a second compressor disposed downstream of the first compressor and having an inlet passage, an auxiliary inlet duct and an auxiliary outlet passage, a change-over valve disposed in flow series between said compressors, said valve having inlets and outlets for communication with said ducts and passages respectively, and having internal passageways therein which provide flow connections between the inlets and outlets, means being provided for rotating an upstream part of the valve relative to the remainder whereby either one of the ducts may be put into flow communication with a selected one of the passages, and wherein the downstream part of the valve is formed as a main structural element of the engine casing and a support member is connected thereto which extends forwardly therefrom and which carries bearings for rotatably supporting both the rotatable part of the valve and the outer casing of first compressor.

2. A gas turbine engine as claimed in claim 1 and in which the engine has only two compressors, said first compressor being the lower pressure compressor said second compressor being the higher pressure compressor.

3. A gas turbine engine as claimed in claim 1 and in which the means for rotating the upstream part of the valve includes means for clamping the two relatively rotatable parts of the valve in fluid tight engagement when not rotating, and for releasing them from such engagement to enable the relative rotation to take place.

4. A gas turbine engine according to claim 3 and in which the means for rotating the upstream part of the valve comprises at least one Geneva mechanism the output of which is connected by a link to the rotatable upstream part of the casing.

* * * * *